(12) United States Patent
Ho et al.

(10) Patent No.: US 11,838,730 B2
(45) Date of Patent: Dec. 5, 2023

(54) VIRTUAL IMAGE DISPLAY AND CONTROL METHOD THEREOF

(71) Applicant: HTC Corporation, Taoyuan (TW)

(72) Inventors: Chia-Chu Ho, Taoyuan (TW); Ching-Hao Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/571,533

(22) Filed: Jan. 10, 2022

(65) Prior Publication Data

US 2023/0101368 A1  Mar. 30, 2023

Related U.S. Application Data

(60) Provisional application No. 63/247,806, filed on Sep. 24, 2021.

(51) Int. Cl.
*H04R 3/00* (2006.01)
*G02B 27/01* (2006.01)

(52) U.S. Cl.
CPC ........... *H04R 3/002* (2013.01); *G02B 27/017* (2013.01); *G02B 2027/014* (2013.01); *H04R 2410/00* (2013.01); *H04R 2499/11* (2013.01)

(58) Field of Classification Search
CPC ................ H04R 3/002; H04R 2410/07; H04R 2499/11; G02B 27/017; G02B 2027/014

USPC ............................................ 381/56, 58, 71.1
See application file for complete search history.

(56) References Cited

U.S. PATENT DOCUMENTS

| | | | |
|---|---|---|---|
| 11,234,073 B1* | 1/2022 | Xu | G10K 11/17857 |
| 2012/0085093 A1* | 4/2012 | Kim | F28D 20/0052 60/641.8 |
| 2018/0330546 A1* | 11/2018 | Ferrese | H04N 13/383 |
| 2020/0314516 A1* | 10/2020 | Kärkkäinen | H05B 3/34 |
| 2020/0383172 A1* | 12/2020 | McCracken | H04W 88/06 |

FOREIGN PATENT DOCUMENTS

| | | |
|---|---|---|
| CN | 106600705 | 4/2017 |
| CN | 108205409 | 6/2018 |

OTHER PUBLICATIONS

"Office Action of Taiwan Counterpart Application", dated Aug. 10, 2022, pp. 1-7.

* cited by examiner

*Primary Examiner* — William A Jerez Lora
(74) *Attorney, Agent, or Firm* — JCIPRNET

(57) ABSTRACT

A virtual image display includes acoustic sensors and a controller, and a method is for operating the same. The acoustic sensors are for detecting the wind frequency information in the environment. The controller computes time points of the acoustic sensors receiving the wind frequency information, and computes wind direction information based on the time points.

10 Claims, 4 Drawing Sheets

VIRTUAL IMAGE DISPLAY AND CONTROL METHOD THEREOF

CROSS-REFERENCE TO RELATED APPLICATION

This application claims the priority benefit of U.S. provisional application Ser. No. 63/247,806, filed on Sep. 24, 2021. The entirety of the above-mentioned patent application is hereby incorporated by reference herein and made a part of this specification.

FIELD OF THE INVENTION

This invention relates to a virtual image display and an operation method thereof, particularly to a virtual image display capable of adjusting display effect in response to airflow change in the environment, and an operation method of the same.

DESCRIPTION OF RELATED ART

With advances in electronic technology, the virtual image display capable of making virtual reality and augmented reality gradually becomes a mainstream. In current technology of the field, in addition to providing displayed images of virtual reality and augmented reality on the virtual image display, improving the user experience in the virtual reality and the augmented reality is also important. How to allow users to integrate the feelings in the real environment with the virtual world is the technical focus of the designer.

SUMMARY OF THE INVENTION

This invention provides a virtual image display and an operation method thereof, which are able to effectively improve the user experience in the virtual reality.

The virtual image display of this invention includes a plurality of acoustic sensors and a controller. The acoustic sensors are for detecting the wind frequency information in the environment. The controller is coupled to the acoustic sensors, and computes a plurality of time points of the acoustic sensors receiving the wind frequency information and computes wind direction information based on the time points.

The operation method of this invention is applicable to a virtual image display, including: providing a plurality of acoustic sensors to detect the wind frequency information in the environment, and computing a plurality of time points of the acoustic sensors receiving the wind frequency information and computing wind direction information based on the time points.

Accordingly, in this invention, the wind frequency information in the environment is received through a plurality of acoustic sensors arranged at different positions, and the airflow state in the environment is known by judging the order of the plurality of acoustic sensors receiving the wind frequency information. The virtual image display can adjust the displayed virtual image corresponding to the airflow state in the environment to effectively improve the user experience in the virtual reality.

DESCRIPTION OF THE EMBODIMENTS

Figure 1:
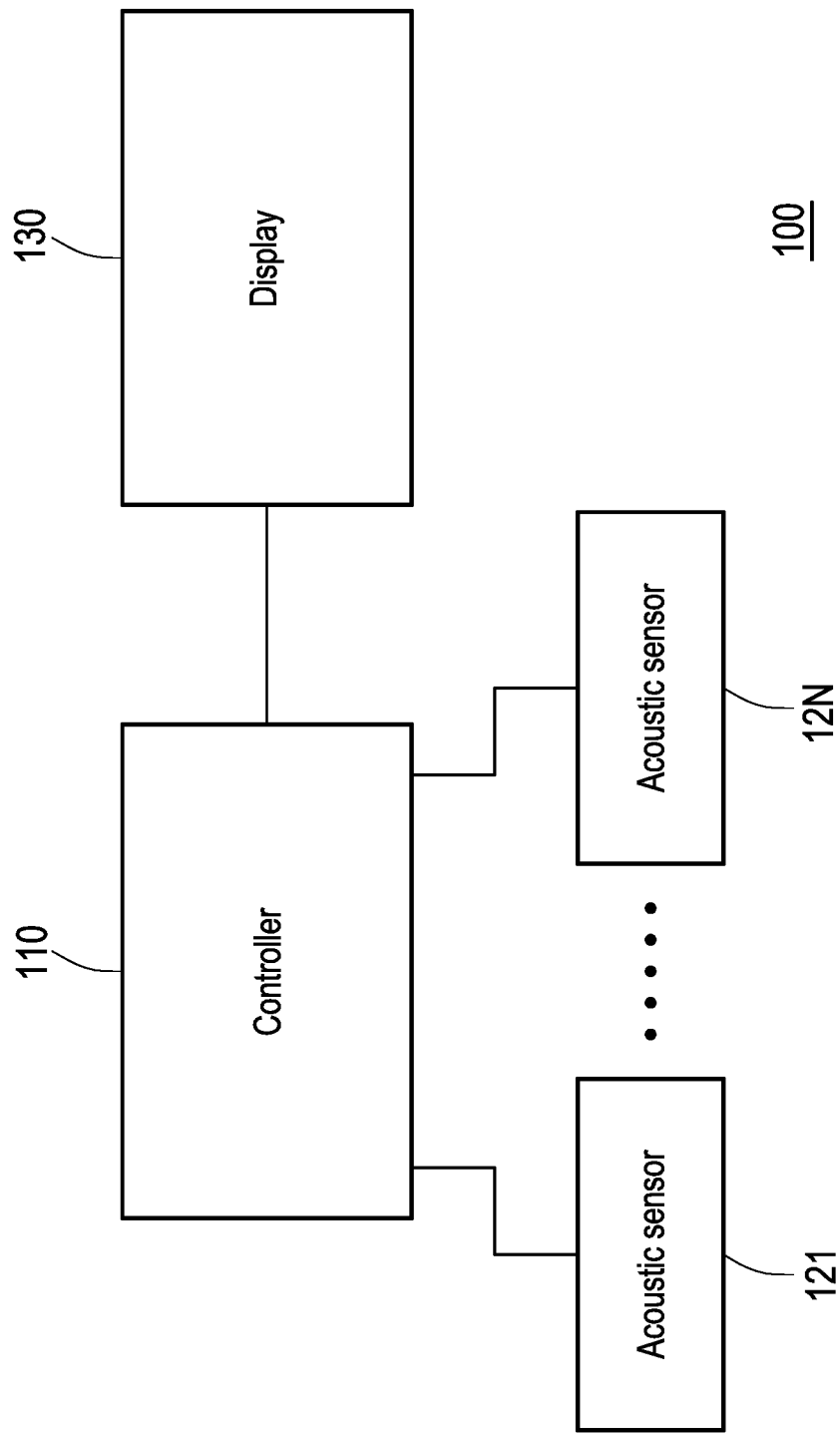
FIG. 1 is a block diagram of a virtual image display according to an embodiment of this invention.

FIG. 1 is a block diagram of a virtual image display according to an embodiment of this invention. Referring to FIG. 1, the virtual image display 100 includes a controller 110, a plurality of acoustic sensors 121 to 12N, and a display 130. The controller 110 is coupled to the acoustic sensors 121 to 12N and the display 130. The acoustic sensors 121 to 12N may be respectively disposed at a plurality of different positions on the surface of the virtual image display 100. The acoustic sensors 121 to 12N can sense the wind frequency information caused by the airflow in the environment. The controller 110 can record the respective time points of the respective acoustic sensors 121 to 12N receiving the wind frequency information, judge the order of the time points, and compute the wind direction information concerning the air flow direction in the environment based on the order of the time points and the positions of the acoustic sensors 121 to 12N.

For example, if the controller 110 judges that the acoustic sensor 121 received the wind frequency information at a first time point t1 and then the acoustic sensor 12N received the wind frequency information at a second time point t2, the controller 110 is able to judge that in the environment there was wind blowing from the installation position of the acoustic sensor 121 to the installation position of the acoustic sensor 12N.

Moreover, after the controller 110 computes the wind direction information, it is possible to display a virtual image corresponding to the wind direction information in the display 130 through an executed application program. For example, in a case where there is a free flying balloon in the virtual image displayed in the display 130, after the controller 110 computes the wind direction information in the environment, the program can adjust the flying direction of the balloon in the display 130 according to the wind direction information. Or, in a case where the user is subject to a flight experience (such as controlling a paraglider) in the virtual reality, after the controller 110 computes the wind direction information in the environment, the display 130 can allow the user to feel the affect of the wind in the environment to the paraglider in response to the wind direction information. Thereby, the user experience in the virtual reality can be much improved.

Further, in an embodiment, the controller 110 can further calculate the time differences between the plural time points of sequential receptions of the wind frequency information and divide the distances between the acoustic sensors 121 to 12N by the time differences to obtain the wind speed information of the airflow in the environment. With the wind speed information, the controller 110 can make the display 130 reflect different wind speeds of from light wind to strong wind to allow the user to have an experience more integrated with the real environment.

In addition, the acoustic sensors 121 to 12N may also send data of the intensity (such as the amplitude) of the sensed wind frequency information to the controller 110. Thereby, the controller 110 is able to control the display 130 to make a corresponding display effect according to at least one of the wind direction information, the wind speed information and the wind power information.

In terms of the hardware architecture, the controller 110 may be a processor with computing capability. Alternatively, the controller 110 may be a hardware circuit that has been designed using a hardware description language (HDL) or other digital circuit design method known by one of ordinary skill in the art and has been implemented with a field programmable gate array (FPGA), complex programmable logic devices (CPLD) or an application-specific integrated circuit (ASIC). The acoustic sensors 121 to 12N may be microphones in any form, and the display 130 may be a display in any form known by one of ordinary skill in the art, both without particular limitations.

Figure 2:
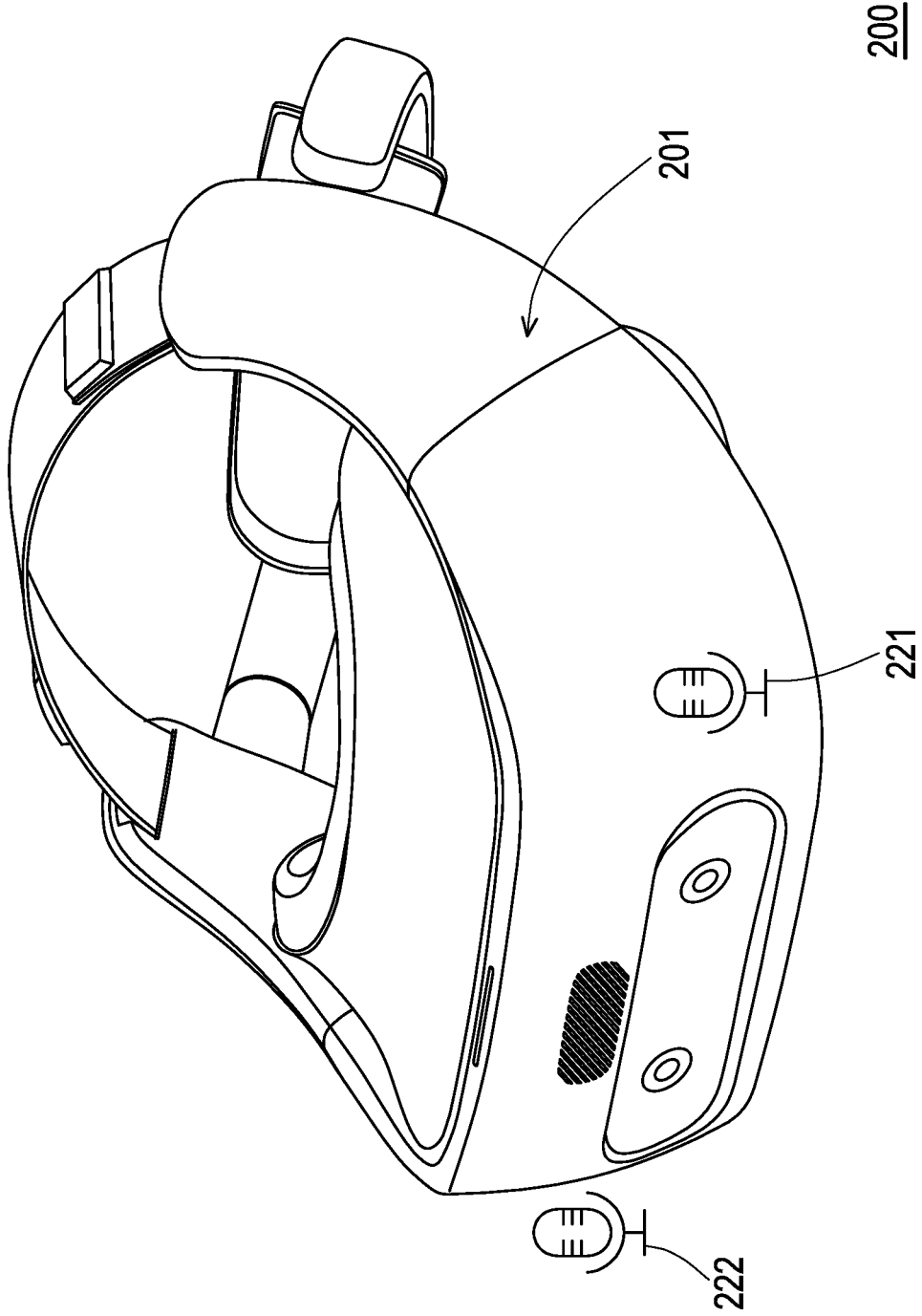
FIG. 2 schematically illustrates a virtual image display according to an embodiment of this invention.

FIG. 2 schematically illustrates a virtual image display according to an embodiment of this invention. Referring to FIG. 2, the virtual image display 200 is a head-mounted display, including: a main body 201, and acoustic sensors 221 and 222 installed at two different positions on the main body 201 of the virtual image display 200. The acoustic sensors 221 and 222 may be microphones.

Figure 3:
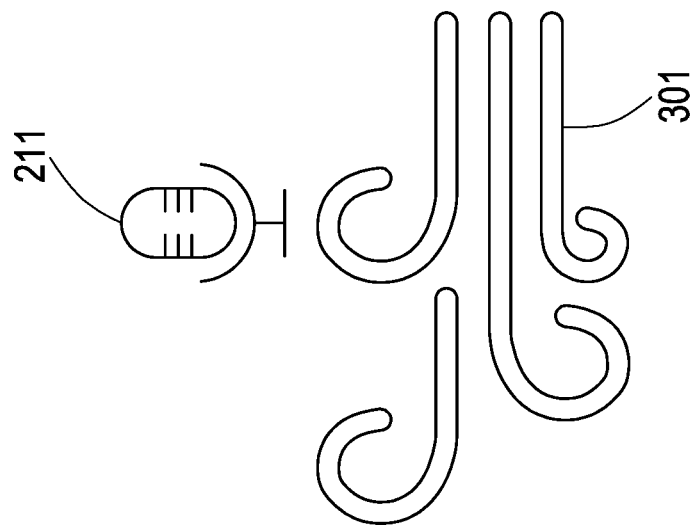
FIG. 3 schematically illustrates the method of deriving the wind direction information according to an embodiment of this invention.
Figure 3:
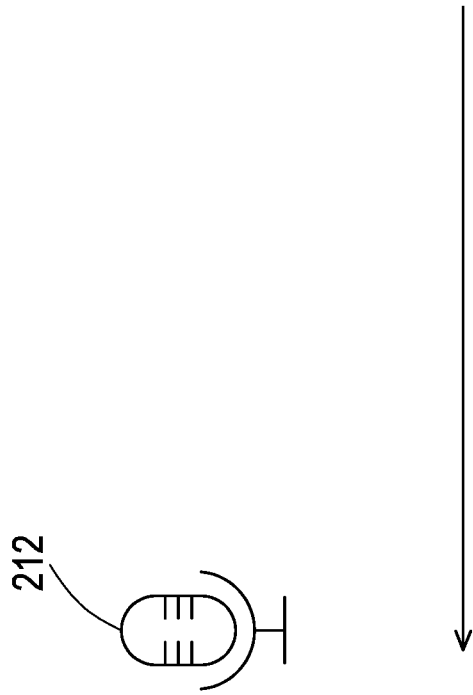

Also referring to FIG. 3 that schematically illustrates the method of deriving the wind direction information according to an embodiment of this invention, in the action of sensing the wind frequency information, in a case where the airflow 301 flows from the acoustic sensor 221 to the acoustic sensor 222, the acoustic sensor 221 can sense the wind frequency information of the airflow 301 at a first time point t1, and the acoustic sensor 222 can sense the same at a second time point t2, wherein the first time point t1 is earlier than the second time point t2. Based on the fact that the first time point t1 is earlier than the second time point t2, the controller 110 can judge that the airflow 301 flows from the acoustic sensor 221 to the acoustic sensor 222 as wind direction information.

Referring to FIG. 2 again, the acoustic sensors 221 and 222 may be installed at two opposite positions on the main body 201. In other embodiments of this invention, the number of the installed acoustic sensors may be more than two, and the acoustic sensors may be installed at any positions on the main body 201, without particular limitation.

Figure 4:
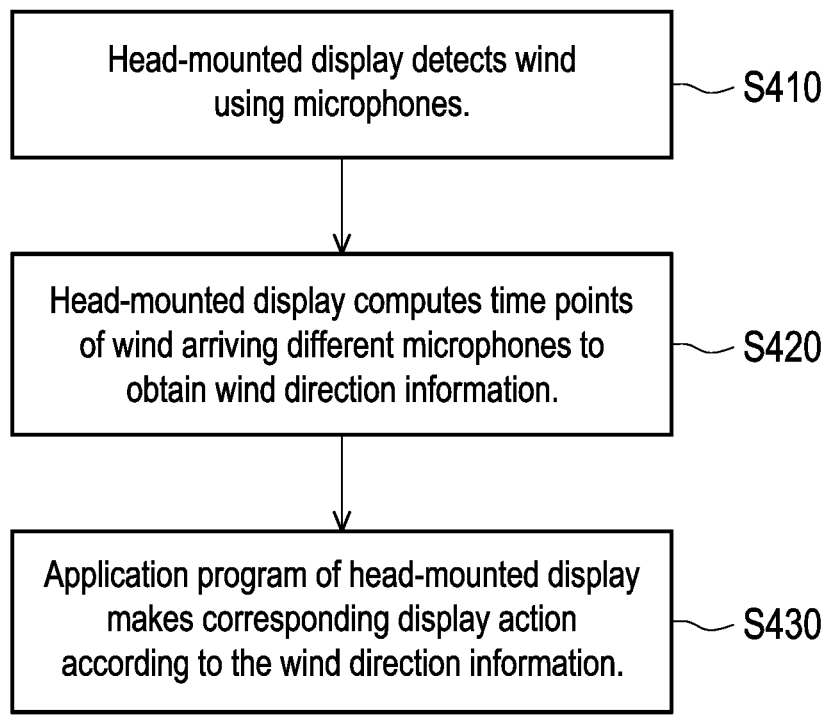
FIG. 4 is a flow chart of the operation of the virtual image display according to an embodiment of this invention.

Referring to FIG. 4, FIG. 4 is a flow chart of the operation of the virtual image display according to an embodiment of this invention. In this embodiment, the virtual image display is a head-mounted display. In the step S410, the head-mounted display detects the airflow in the environment using microphones, wherein the airflow in the environment causes wind. In the step 420, the head-mounted display computes the time points of the airflow-caused wind arriving different microphones to obtain wind direction information. In details, the head-mounted display may compute the time points of the plural microphones detecting the wind frequency information of the wind to know the above arrival time points, and may sort these time points to know the wind direction information about the flow direction of the wind. In the step S430, the application program of the head-mounted display makes a corresponding display action according to the wind direction information. Thereby, the wind felling of the user received in the real world can be felt synchronously in the virtual reality world to effectively improve the experience feelings of the user.

Incidentally, in an embodiment of this invention, the head-mounted display may also compute the wind speed information and/or the wind power information together with the wind direction information and then make a corresponding display action on the display through an application program, so as to further improve the experience feelings of the user.

Figure 5:
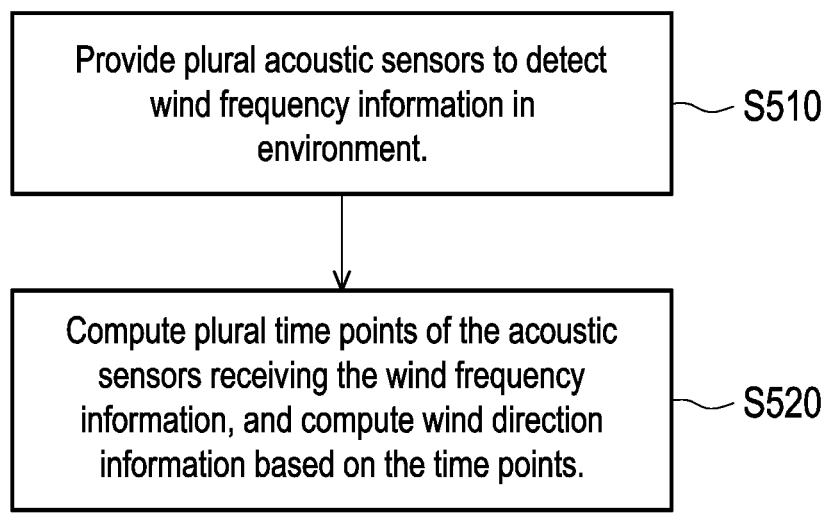
FIG. 5 is a flow chart of an operation method for a virtual image display according to an embodiment of this invention.

Referring to FIG. 5, FIG. 5 is a flow chart of an operation method for a virtual image display according to an embodiment of this invention. In the step S510, plural acoustic sensors are provided possibly by the virtual image display to detect the wind frequency information in the environment. In the step S520, plural time points of the plural acoustic sensors receiving the wind frequency information are computed and then wind direction information is computed based on the time points, possibly by the virtual image display.

Regarding detailed actions of the above steps, they have been described in details in the above embodiments and are not described again here.

In summary, the virtual image display of this invention detects the air flow state in the environment using acoustic sensors to obtain the wind direction information in the environment. Thereby, the virtual image display can make a corresponding action according to the wind direction information to effectively improve the user experience in the virtual reality.

The invention claimed is:

1. A virtual image display, comprising:
a plurality of acoustic sensors, for detecting wind frequency information in the environment; a controller, coupled to the acoustic sensors, and computing a plurality of time points of the acoustic sensors receiving the wind frequency information and computing wind direction information based on the time points,
a main body, wherein the acoustic sensors are installed at a plurality of different positions on the main body, and the different positions have a separation distance larger than a preset distance therebetween,
wherein the controller obtains the time points based on the separation distance of the different points therebetween,
wherein the controller computes the wind direction information according to the order of the time points and the different positions.

2. The virtual image display of claim 1, wherein in a case where a first acoustic sensor installed at a first position received the wind frequency information at a first time point and a second acoustic sensor installed at a second position received the wind frequency information at a second time point, the controller determines the wind direction information based on an order of the first time point and the second time point.

3. The virtual image display of claim 2, wherein the controller further computes wind speed information based on a difference between the first time point and the second time point and a distance between the first position and the second position.

4. The virtual image display of claim 1, wherein the controller further computes wind power information based on intensity of the wind frequency information.

5. The virtual image display of claim 1, further comprising:
a display, coupled to the controller, and adjusting a displayed virtual image based on the wind direction information.

6. An operation method for a virtual image display, comprising:
providing a plurality of acoustic sensors to detect wind frequency information in an environment;

computing a plurality of time points of the acoustic sensors receiving the wind frequency information and computing wind direction information based on the time points, wherein the plurality of acoustic sensors are installed at a plurality of different positions on a main body, and the different positions have a separation distance larger than a preset distance therebetween, obtaining the time points based on the separation distance of the different positions therebetween, and computing the wind direction information according to the order of the time points and the different positions.

7. The operation method of claim 6, wherein the step of computing the time points of the acoustic sensors receiving the wind frequency information and computing the wind direction information based on the time points comprises:

a first acoustic sensor installed at a first position receiving the wind frequency information at a first time point;

a second acoustic sensor installed at a second position receiving the wind frequency information at a second time point; and determining the wind direction information based on an order of the first time point and the second time point.

8. The operation method of claim 7, further comprising:

computing wind speed information based on a difference between the first time point and the second time point and a distance between the first position and the second position.

9. The operation method of claim 6, further comprising computing wind power information based on intensity of the wind frequency information.

10. The operation method of claim 6, further comprising:

providing a display that adjusts a displayed virtual image according to the wind direction information.

* * * * *